(12) United States Patent
Condorovici et al.

(10) Patent No.: US 12,143,723 B2
(45) Date of Patent: *Nov. 12, 2024

(54) METHOD AND SYSTEM FOR CAMERA MOTION BLUR REDUCTION

(71) Applicant: FotoNation Limited, Galway (IE)

(72) Inventors: Razvan Condorovici, Bucharest (RO); Bogdan Petcu, Bucharest (RO); Piotr Stec, Galway (IE)

(73) Assignee: FotoNation Limited (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,040

(22) Filed: Oct. 5, 2023

(65) Prior Publication Data

US 2024/0031676 A1  Jan. 25, 2024

Related U.S. Application Data

(63) Continuation of application No. 17/541,222, filed on Dec. 2, 2021, now Pat. No. 11,812,146.

(51) Int. Cl.
*H04N 23/68* (2023.01)

(52) U.S. Cl.
CPC ..... *H04N 23/6845* (2023.01); *H04N 23/6811* (2023.01); *H04N 23/6812* (2023.01); *H04N 23/683* (2023.01)

(58) Field of Classification Search
None
See application file for complete search history.

(56) References Cited

U.S. PATENT DOCUMENTS

| | | | | |
|---|---|---|---|---|
| 9,438,897 | B2* | 9/2016 | Barreto | G06T 7/80 |
| 11,812,146 | B2* | 11/2023 | Condorovici | H04N 23/76 |
| 2015/0326769 | A1* | 11/2015 | Richarte | G01C 11/025 |
| | | | | 348/169 |
| 2016/0205324 | A1* | 7/2016 | Lammers | G03B 17/38 |
| | | | | 348/208.2 |
| 2016/0360111 | A1* | 12/2016 | Thivent | H04N 23/55 |
| 2017/0118400 | A1 | 4/2017 | Hesch et al. | |
| 2018/0192022 | A1* | 7/2018 | Wang | H04L 65/752 |
| 2021/0218894 | A1 | 7/2021 | Stec | |
| 2022/0394180 | A1 | 12/2022 | Wang et al. | |

* cited by examiner

*Primary Examiner* — Cynthia Segura
(74) *Attorney, Agent, or Firm* — Lerner David LLP

(57) ABSTRACT

A method for reducing camera motion blur comprises, before acquiring an image frame for a video stream, a camera measurement unit measuring data related to a camera module motion during a time window; determining camera module motion based on the measured data and predicting a camera motion blur during acquisition of the image frame based at least on the determined camera module motion and the lens projection model; determining whether the predicted camera motion blur exceeds a threshold; in response to determining that the predicted camera motion blur exceeds the threshold, determining a reduction of the provisional exposure time determined to acquire the image frame so that the predicted camera motion blur reaches the threshold, determining whether a corresponding increase in the provisional gain determined to acquire the image frame is below a maximum gain value, adjusting the provisional exposure time and gain, and acquiring the image frame.

20 Claims, 4 Drawing Sheets

METHOD AND SYSTEM FOR CAMERA MOTION BLUR REDUCTION

CROSS-REFERENCE TO RELATED APPLICATIONS

This application is a continuation of U.S. application Ser. No. 17/541,222, filed on Dec. 2, 2021, the disclosure of which is incorporated herein by reference.

FIELD

The present invention relates to camera motion blur reduction in successively acquired image frames for a video stream.

BACKGROUND

An image acquisition system uses an optical lens to converge incoming light rays from a scene on a surface of an image sensor. The image sensor converts the incoming light energy into an electrical signal that is processed to produce an image of the scene. As such, an image acquisition system is configured to project, via the optical lens, a scene in the 3D world into a 2D image space.

Each image is acquired by exposing the surface of the image sensor to the converged incoming light rays for a certain amount of time (exposure time). In particular, an auto-exposure module of the acquisition system can set exposure parameters, including a combination of the exposure time with an image sensor gain, to provide a proper exposure level to acquire an image.

If during the exposure time the image sensor-lens ensemble changes its position relative to the scene under acquisition in the real 3D world, each of a set of points belonging to a same object in the real scene is projected on the image sensor surface at multiple locations. This results in multiple representations of projected scene points on the 2D image space, causing a "trail" in the acquired image.

Although this image artifact, known as camera motion blur, can affect any acquired still image or video stream, it becomes more apparent to the viewer's eyes in stabilized video streams. This is a side effect of electronic video stabilization, that is largely employed in modern video acquisition system for improving the perceived quality of an acquired video stream.

There are two main reasons for this side effect:
1) In video acquisition scenarios involving a dynamic scene where at least one object is moving, a high camera motion can occur to track the moving object. The resulting camera motion blur trail is not critically visible in the acquired image, because the amount of camera motion blur correlates with the velocity of the tracked object, and looks natural. However, in the case of stabilized video streams, the content of the scene is more steady (stabilized), while the original camera motion blur is still present in the acquired image. As such, the correlation between the motion of the tracked object within the scene and its blur in the acquired image due to the camera motion is reduced by applying scene stabilization, which makes the camera motion blur trails more visible
2) Cropping a region of input image frames is part of each video stabilization solution. In particular, many video stabilization solutions require upscaling of cropped stabilized image frames to the initial resolution of the input frames. This implies an upscale of the camera motion blur trails present in the initial input image frames that makes the camera motion blur more visible in the stabilized videos.

Conventional approaches to address this issue include:
1) Correcting camera motion blur in image frames for a video stream, after acquisition of these frames. The amount of computational power required by this conventional approach is substantial, thus making difficult to achieve a real time processing speed. Furthermore, the quality of the achieved correction might not be adequate.
2) Reducing video stabilization strength in motion blur-prone scenarios, like scenarios involving dark environments. Indeed, darker environments require higher exposure times, thus increasing the camera motion blur trails in the image frames acquired for a video stream. Reducing the strength of video stabilization hides at least partly the camera motion blur trails, but with the drawback of obtaining a less stabilized video stream.
3) Preventing camera motion blur generation at the acquisition time of image frames. This is achieved by reducing the exposure time. A reduction in exposure time needs to be compensated by an increase in the gain exposure parameter, to prevent an overall reduction of the exposure level. However, as it is well known, higher gain values generate higher noise levels in the output image frames, thus generating a different kind of undesirable artifacts. U.S. Pat. No. 9,538,083 discloses a wearable camera that is configured to take a cluster of photographs and use image processing techniques to select a photograph with a lesser amount of blur than other photographs in the cluster. The wearable camera can include one or more of a gyroscope or accelerometer for ascertaining the camera's motion. Motion data associated with the camera's motion is utilized to ascertain when to take an automatic photograph.

SUMMARY

According to a first aspect of the present invention there is provided a camera motion blur reduction method according to claim 1. There are also provided an image acquisition system and a computer program product according to claims 14 and 15, respectively.

Based on the assumption that camera module measured before acquiring an image frame for a video stream (e.g., during at least a portion of the exposure time of a previously acquired image frame) is a good indicator of cameral module motion during acquisition of the image frame, embodiments of the present invention provide an adaptive solution for reducing camera motion blur that relies on predicting the camera motion blur during the acquisition of the image frame based at least on the measured camera module motion and the projection model of the camera lens.

In particular, in response to determining that the predicted camera motion blur exceeds an acceptable threshold level and if permitted by a maximum sensor gain value, embodiments of the invention provide an adjustment of the provisional exposure time and gain determined for acquiring the image frame at a proper exposure level, by applying:
  a reduction to the provisional exposure time so that predicted camera motion blur reaches the threshold, and
  a corresponding increase in the provisional gain so as to maintain the proper exposure level.

In practice, maximum gam value permitting, a balanced adjustment of the provisional exposure time and gain is provided to limit the predicted camera motion blur to the acceptable threshold level without causing an under-exposure of the image frame.

Unlike conventional approaches based on image analysis for assessing motion blur, the adaptive solution provided by the embodiments of the invention relies on predicting the extent of camera motion blur during the acquisition of the image frame, based on measurements of camera module motion occurring before the acquisition of the image frame (thus limiting the computation required to predict the camera motion blur).

Furthermore, unlike conventional approaches based on indiscriminately limiting the exposure time in order to reduce camera motion blur, the adaptive solution provided by the embodiments of the invention relies on the predicated camera motion blur to reduce the provisional exposure time only if a risk of camera motion blur is determined (when the predicted camera motion blur exceeds the threshold).

In some alternative embodiments, the provisional gam IS still increased to reach the maximum gain value, but the exposure time is reduced so as the predicted camera motion blur reaches the threshold. In this way, the predicted camera motion blur is limited to the threshold, although a level of under-exposure is accepted for acquiring the image frame.

In some embodiments, if the predicted camera blur motion is determined to be below the threshold, the provisional exposure time is increased so as the predicted camera motion blur reaches the threshold and a corresponding reduction is applied to the provisional gain. In practice, since the predicted camera motion blur is determined to be below the threshold (meaning that the camera module is predicted to be relatively stable during the acquisition of the image frame), a reduction of the provisional gain is allowed in order to reduce the noise level in the acquired image frame, and this reduction is compensated by an increase in the provisional exposure time that keeps the camera motion blur at the acceptable threshold level.

BRIEF DESCRIPTION OF THE DRAWINGS

Embodiments of the invention will now be described, by way of example, with reference to the accompanying drawings, in which.

DETAILED DESCRIPTION

Figure 1:
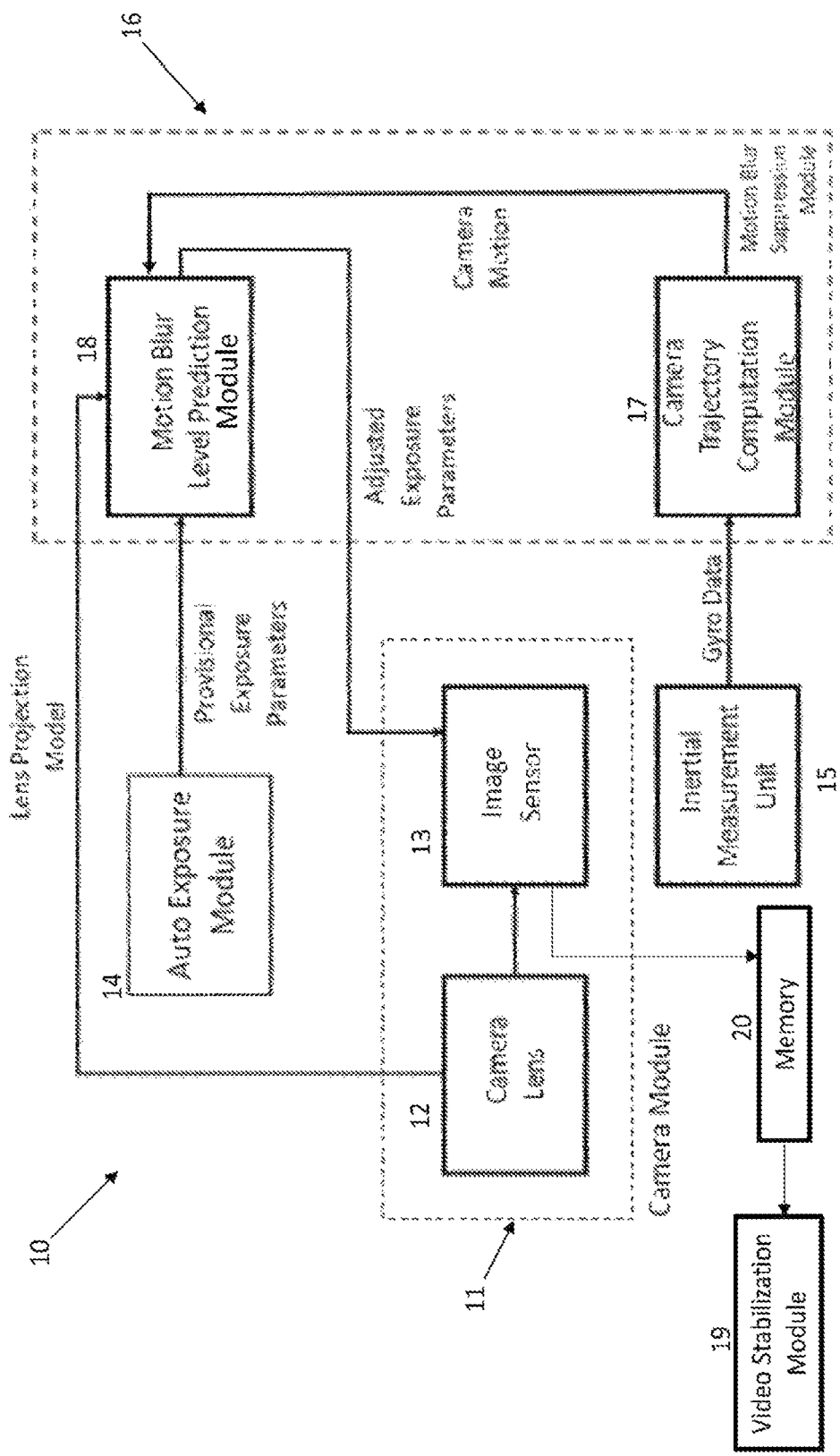
FIG. 1 illustrates an image acquisition system for camera motion blur reduction according to an embodiment of the present invention.

Referring now to FIG. 1, there is shown an Image acquisition system 10 configured to operate according to a camera motion blur reduction method according to an embodiment of the present invention.

The system 10 comprises a camera module 11 including a lens 12, preferably with variable focal length, and an image sensor 13. The lens 12 is associated with a mathematical projection model that is used by the system 10 during operation of the camera blur reduction method. Various lens projection models can be used by the system 10, with the requirement of providing at least a set of two functions describing, respectively, a point forward projection a 3D virtual world to the 2D image space associated with the camera module 11 and a point backward projection from the 2D image space to the 3D virtual world.

Figure 3:
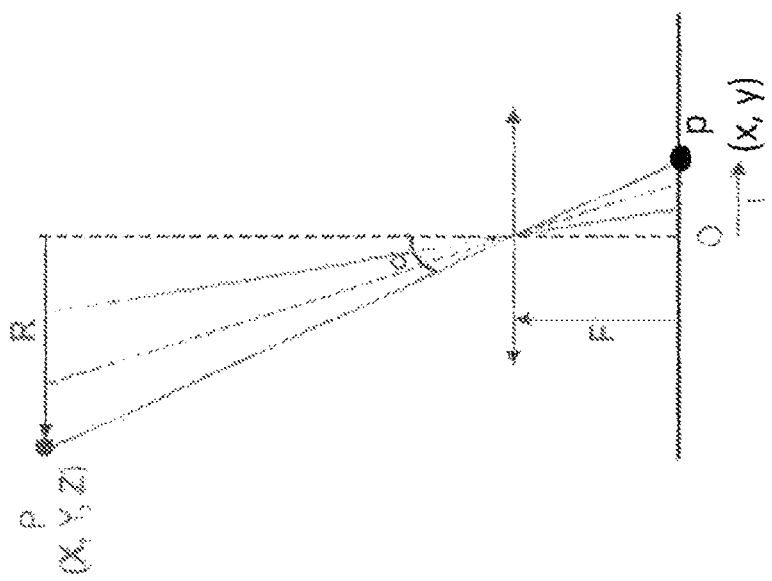
FIG. 3 illustrates a point projection between a 3D space and an image 2D space base don a projection model of the lens employed in the system of FIG. 1.

With reference to FIG. 3, an exemplary variable lens projection model is characterized by the optical center 0 (Ox, Oy) of the lens 12, the variable focal distances F of the lens 12, and two distortion characterizations described in look up tables. In particular, the lens projection model includes the following set of equations for projecting forward a point P, at coordinates X, Y, Pin the virtual 3D world, to a point p, at coordinates x, yin the 2D image space:

$$R = \sqrt{X^2 + Y^2}$$

$$\alpha = a\tan 2(R, Z)$$

$$k = \text{LUTF}(\alpha)$$

$$z = F_x kX + O_x$$

$$y = F_y kY + O_y$$

The lens projection model further includes the following set of equations for projecting back point p to point P $$x' = \frac{x - O_x}{F_x}, y' = \frac{y - O_y}{F_y}$$

$$\alpha = \text{LUTB}\left(\sqrt{x'^2 + y'^2}\right)$$

$$k = \frac{\sin(\alpha)}{r}$$

$$X = kx'$$

$$Y = ky'$$

$$Z = \cos(\alpha)$$

With reference back to FIG. 1, the system 10 further includes:

An auto-exposure module 14 configured to determine, via an auto-exposure algorithm, a set of provisional (candidate) exposure parameters to be used for acquiring each image frame for a video stream with a proper level of exposure. It is to be noted that for the purposes of the present disclosure, a proper level of exposure can be considered for example an exposure level allowing a significant portion of the pixels in an acquired image to have a value within the exposure range of the sensor 11. In determining the set of provisional exposure parameters, the auto-exposure module 14 can take into account at least the brightness conditions of the scene under acquisition (and can possibly consider external commands received by a user of the device including the system 10, e.g., a digital camera, a smartphone or any other portable computing or communication device). The determined set of parameters for acquiring an image frame include at least a provisional exposure time in combination with a provisional sensor gain. As such, the exposure level associated with determined parameters is a function of at least the product between the provisional exposure time and gain.

An inertial measurement unit, IMU, 15 that includes one or more gyroscopes configured to measure an angular velocity of the camera module 11 on three rotation axes (gyroscope measurement data). It is to be noted that the IMU 15 itself or other dedicated units or modules of the system 10 can comprise additional inertial or magnetic sensors, such as accelerometers, configured to measure other data related to the camera module motion. These data can be used in combination with the gyroscope measurement data (e.g., to extend, improve or refine the gyroscope measurement data). Furthermore, it is to be noted that in embodiments where the system 10 is included in smartphones, tablets or other portable computing or communication devices, the IMU 15 (and any additional sensor) employed by the system 10 can correspond to the IMU (and any additional sensor) generally employed in these devices to enhance device usability, controllability and management. Alternatively, the IMU 15 (and any other additional sensor) employed by the system 10 can comprise separate units from the IMU (and any other additional sensor) employed in these devices for generic purposes, located within or in close proximity to the camera module 11.

A camera motion blur suppression module 16 including:

A camera trajectory computation module 17 configured to integrate and transform the gyroscope data measured by the IMU 15 at various moments in time into corresponding quaternions representing camera module orientations. The module 17 is further configured to store the quaternions in a camera module orientation buffer that represents the camera module orientation at the various moments when the gyroscope data have been measured by the IMU 15.

A camera motion blur level prediction module 18 configured to calculate, based on the camera orientations stored in the camera module orientation buffer, a camera module rotation occurred before acquisition of an image frame, and to predict a camera motion blur during acquisition of the image frame based on the calculated camera rotation and the lens projection model. The module 18 is further configured to adjust the provisional exposure time and gain determined by the auto-exposure module 14 for acquiring the image frame based on the predicted camera motion blur (and as permitted by a maximum sensor gain value, 1AX).

A video stabilization module 19 configured to retrieve the image frames acquired by the image sensor 13 from a memory 20 of the system 10 (or from any other memory accessible by the system 10, where the image frames are stored after acquisition), and process the retrieved image frames with a view to producing a stabilized video signal.

Figure 2:
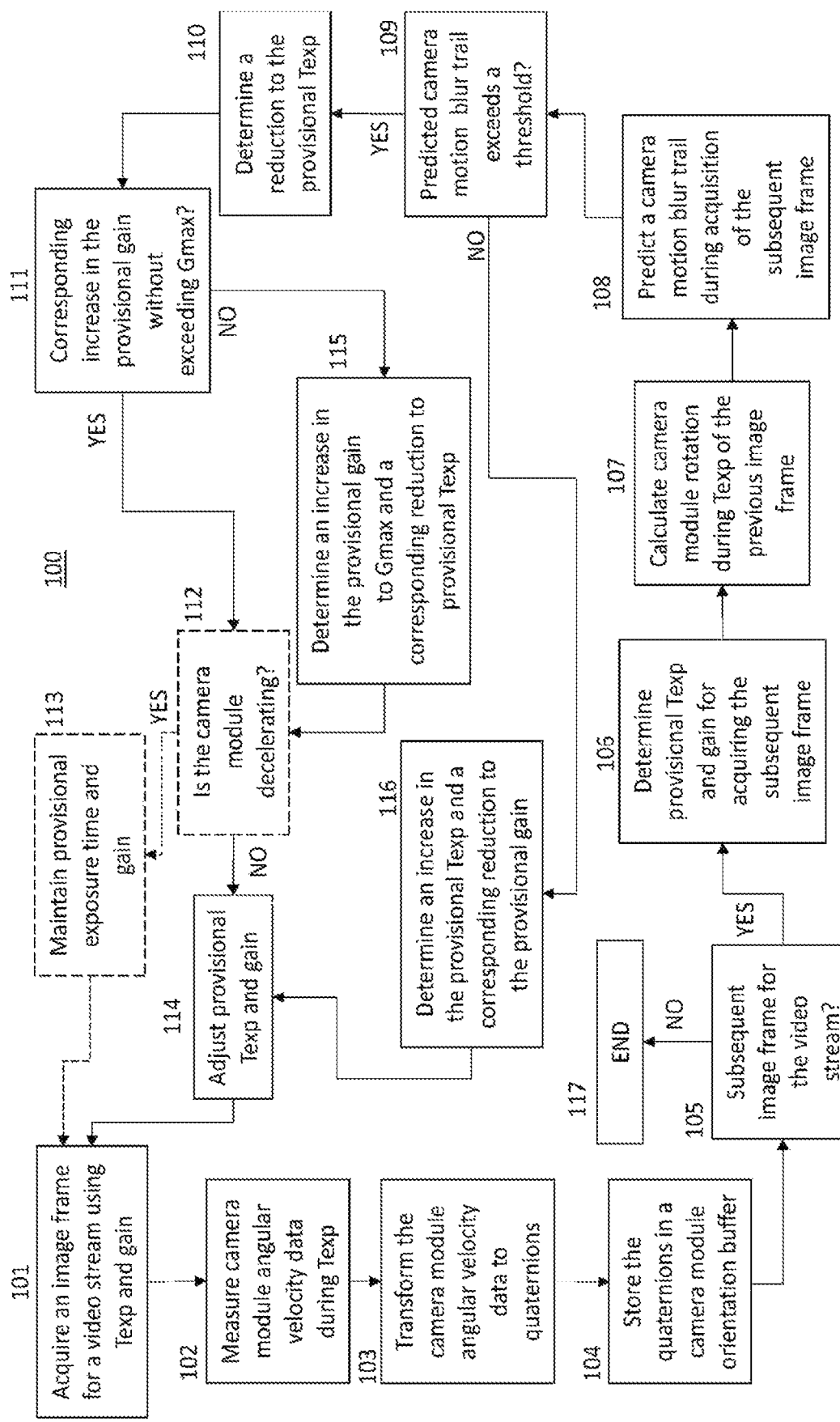
FIG. 2 illustrates a method that can be operated by the system of FIG. 1 for camera motion blur reduction according to an embodiment of the present invention.

The configuration and functionality of the system 10, and especially of the camera motion blur suppression module 16, will be now disclosed in more detail by referring to the operation of the method 100 illustrated in FIG. 2 that can be performed by system 10 according to embodiments of the invention.

Figure 4:
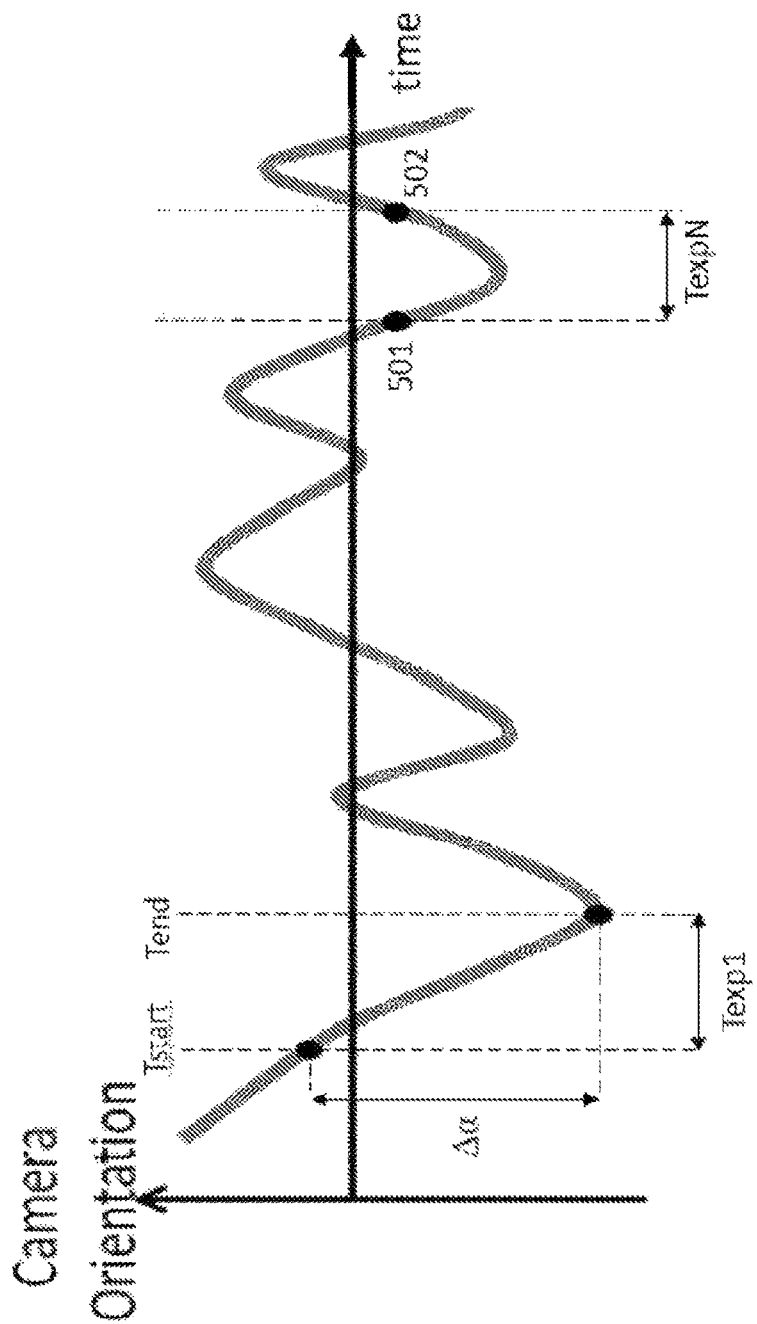
FIG. 4 illustrates a camera module orientation along a reference axis and over a time period including an exposure time used for acquiring a first Image frame for a video stream, according to the operation of the method of FIG. 2.

With reference to FIGS. 2 and 4, the operation of the method 100 starts with the acquisition, via the image sensor 13, of a first image frame for a video stream (step 101). In particular, the first image frame is acquired during an initial exposure time $T_{exp1}$ and using an initial sensor gain G1 that are proposed by the auto-exposure module 14 to achieve a proper image exposure level.

The IMU 15 measures gyroscope data related to the 3D angular velocity of the camera module 11 at different moments during $T_{exp1}$ (step 102). The gyroscope data include at least data measured at the beginning ($T_{start}$) and end ($T_{end}$) of $T_{exp1}$.

The camera trajectory computation module 17 integrates and transforms the measured gyroscope data into corresponding quaternions $Q_{start} \ldots Q_{end}$, each representing a camera module orientation at the moment when the corresponding gyroscope data have been measured by the IMU 15 (step 103). It is to be noted that the module 17 can be alternatively configured to transform the measured gyroscope data into any other form suitable for representing camera module orientation.

The module 17 stores the obtained quaternions in the camera module orientation buffer (step 104).

Then the method 100 proceeds by determining whether a subsequent image frame has to be acquired for the video frame (step 105).

In response to a positive determination at step 105, the auto-exposure module 14 determines a set of provisional auto exposure parameters for acquiring the subsequent image frame with a proper, good quality, exposure level (step 106). The determined set of exposure parameters include at least a provisional exposure time $T_{exp2\_provisional}$ in combination with a provisional sensor gain G2 provisional. It to be appreciated that $T_{exp2\_provisional}$ and $G_{2\_provisional}$ can correspond to or be different than $T_{exp1}$ and $G_1$ used to acquire the starting image frame at step 101, depending on the brightness or other parameters of the scene being the same or different than during $T_{exp1}$.

The camera motion blur level prediction module 18 retrieves from the camera module orientation buffer at least the quaternions $Q_{start}$, $Q_{end}$ representing the camera module orientations at $T_{start}$ and $T_{end}$ of $T_{exp1}$. Then, the module 18 calculates (step 107) the camera module rotation Δα occurring during $T_{exp1}$ as:

$$\Delta\alpha = Q_{-start} * \text{conjungate}(Q_{end}).$$

Based on the assumption that Δα is a good enough prediction of the camera module rotation that will occur during the planned acquisition of the subsequent image frame, the module 18 predicts a length of a camera motion blur trail occurring during the planned acquisition based on Δα and the lens projection model (step 108).

In some embodiments, the module 18 predicts the length of the camera motion blur trial based on Δα and the lens projection model by:

i) selecting at least two reference points in the 2D image space at different starting positions with coordinates xO, yO and xO', yO', respectively. For example, the two reference points can be selected each closer to a corresponding boundary of the 2D image space (such as two points symmetrical relative to the center of the 2D image space);

ii) projecting, based on the lens projection model, each of the two reference points into a virtual 3D space at different positions with coordinates XO, YO, ZO and XO', YO', ZO', respectively;

iii) rotating each of the two projected reference points with the calculated camera module rotation da, obtaining two different rotated reference points at coordinates XI, YI, ZI and XI', YI', ZI', respectively;

iv) projecting back, based on the lens projection model, the two rotated reference points from the virtual 3D space to the 2D image space, at corresponding end positions with coordinates xi, yi and xi', yi', respectively (different that the coordinates xO, yO and xO', yO' of the starting positions of the two selected reference points);

v) computing camera motion blur trail lengths Trail-Length1 and TrailLength2 as the distances between the start and the end positions of the two selected reference points, according to the equations:

$$\text{TrailLength1} = \sqrt{(x0-x1)^2 + (y0-y1)^2}$$

$$\text{TrailLength2} = \sqrt{(x0'-x1')^2 + (y0'-y1')^2}$$

vi) selecting the maximum of TrailLength1 and TrailLength2 as the prediction of the camera motion blur trail during the acquisition of the subsequent image frame.

It is to be further appreciated that, according to alternative embodiments, a length of the camera motion blur trail can be predicted by operating steps similar to the above disclosed steps ii)-v), but selecting a single reference point (e.g., the center of the image space 2D. However, it is preferable to use at least two reference points for the prediction of the camera motion blur trail, because if the camera module 11 rotates only along the roll axis during $T_{exp1}$ and only the center of the 2D image space is selected as reference point, this reference point will not move at all due to the rotation (whereas points closer to the image boundary will move).

Furthermore, in some alternative embodiments $T_{exp1}$ can be divided in smaller time segments for performing the prediction of the camera motion blur trial. In particular, according to these embodiments:

at step 102, in addition to gyroscope data related to the 3D angular velocity of the camera module 11 at $T_{start}$ and $T_{end}$ of $T_{exp1}$, the IMU 15 also measures gyroscope data at a plurality of different moments between $T_{start}$ and $T_{end}$, so as to divide $T_{exp1}$ in a plurality of N time segments between successive measurements;

in addition to the quaternions $Q_{start}$, $Q_{end}$ representing camera module orientations at $T_{start}$ and $T_{end}$ of $T_{exp1}$, the module 18 retrieves from the camera orientation buffer a plurality of quaternions representing intermediate camera module orientations corresponding to the plurality of gyroscope data measured between Tstart and Tend;

at step 107, based on the retrieved quaternions, the module 18 calculates a plurality of camera module rotations $\Delta\alpha_1 \ldots \Delta\alpha_N$ occurring during each of the N segments of $T_{exp1}$; and at step 108, the module 18 calculates a plurality of camera motion blur trail lengths, TrailLength1 . . . TrailLengthN, each corresponding to one of the plurality of camera module rotations $\Delta\alpha_1 \ldots \Delta\alpha_N$. This calculation is performed in a way similar to the above disclosed calculation based on the overall camera module rotation $\Delta\alpha$ occurring between $T_{start}$ and $T_{end}$ of $T_{exp1}$ (either performed by selecting two reference points or a single reference point in the 2D image space).

The module 18 then combines the calculated TrailLength1 . . . TrailLengthN to obtain an overall prediction of the camera motion blur trail length during acquisition of the subsequent image frame, e.g. by computing an average or other statistical combination of TrailLength1 . . . TrailLengthN.

In this way, a closer (more granular) approximation of the camera module rotation trajectory is obtained than just considering the overall camera module rotation Aa occurring between Tstart and $T_{end}$ of $T_{exp1}$. This closer approximation improves the prediction of the camera motion blur trail length, especially in situations where the camera module orientation changes significantly between the start and the end of an exposure time, but close to the end the camera module orientation comes back close to the starting orientation. An example of these situations is illustrated in FIG. 4 by the camera orientation points 501, 502 at the beginning and the end of an exemplary exposure time $T_{expN}$.

With reference back to FIG. 2, after step 108 the module 18 determines whether the predicted camera motion blur trail exceeds a threshold (step 109). The threshold value represents an acceptable camera motion blur trail length in the subsequent image frame, e.g., 1 pixel or other acceptable pixel amount.

In response to determining that the predicted camera motion blur trail exceeds the threshold at step 109, the module 18 determines a reduction of $T_{exp2\_provisional}$ so that the predicted camera motion blur trail reaches the threshold (step 110). In practice, if the predicted camera motion blur trail exceeds the threshold by a factor $X_1$, a corresponding reduction of $X_1$ is determined for $T_{exp2\_provisional}$.

However, in order to preserve the good quality overall exposure level achievable according to the provisional exposure parameters recommended by auto-exposure module 14, before applying the $X_1$ factor reduction to $T_{exp2\_provisional}$, the method 100 proceeds by determining whether a corresponding $X_1$ factor increase can be applied to $G_{2\_provisional}$ without exceeding Wax (step 111).

In response to a positive determination, $T_{exp2\_provisional}$ and $G_{2\_provisional}$ are reduced and increased, respectively, by the same $X_1$ factor (step 114), thus reducing the predicted camera motion blur trail to the acceptable threshold level while maintaining the exposure level recommended by the auto-exposure module 14 (as permitted by 1AX).

After step 114, the method 100 proceeds starting again from step 101 where the subsequent image frame for the video stream is acquired using the adjusted $\text{Texp2}_{\_provisional}$ and $G_{2\_provisional}$.

In some embodiments, an additional filtering is applied to the adjusted $T_{exp2\_provisional}$ at the acquiring the subsequent image frame, so as to smooth out changes and to avoid undesired visual effects in the subsequent image frame caused by sudden exposure changes.

Furthermore, in some embodiments, before $T_{exp2\_provisional}$ and $G_{2\_provisional}$ are adjusted at step 114, the module 18 can determine whether the camera module 11 is decelerating (step 112). For example, this determination can be based on camera module angular acceleration measurements provided by an accelerometer within the IMU 15 (and/or by an accelerometer of the system 10 separated from the IMU 15). In addition or alternatively, the camera module acceleration/deceleration can be calculated based on the camera module angular velocities measured by the one or more gyroscopes of the IMU 15.

Based on the assumption that if the camera module 11 is not decelerating the camera module motion will most likely continue during the acquisition of the subsequent image frame, if camera module deceleration is not determined at step 112, $T_{exp2\_provisional}$ and $G_{2\_provisional}$ are adjusted by the same factor $X_1$ at step 114.

Based on the assumption that if the camera module 11 is decelerating the camera module motion will most likely stop during the acquisition of the subsequent image frame, if camera module deceleration is determined at step 112, $T_{exp2\_provisional}$ and $G_{2\_provisional}$ are maintained at step 113 (i.e., the adjustments determined by operation of the previous steps 110-111 are not applied). The method 100 then proceeds to start again from step 101, where the subsequent image frame for the video stream is acquired using the unmodified $T_{exp2\_provisional}$ and $G_{2\_provisional}$.

With reference back to step 111, in response to determining that a X1 factor increase in $G_{2\_provisional}$ would exceed $G_{MAX}$, the module 18 determines a factor $X_2$ (less than $X_1$) to increase $G_{2\_provisional}$ so as to reach $G_{MAX}$, and to reduce $T_{exp2\_provisional}$ (step 115). In this way, the proper exposure level recommended by the auto-exposure module 14 is maintained, while reducing the predicted camera motion blur trail (although not enough to reach the threshold).

Again, in some embodiments, before $T_{exp2\_provisional}$ and $G_{2\_provisional}$ are adjusted at step 114 by applying the X2 factor, the module 18 determines whether the camera module 11 is decelerating (step 112). If camera module deceleration is not determined at step 112, $T_{exp2\_provisional}$ and $G_{2\_provisional}$ are adjusted by the same factor $X_2$ at step 114. If camera module deceleration is determined at step 112, $T_{exp2\_provisional}$ and $G_{2\_provisional}$ are maintained unmodified at step 113.

In alternative embodiments, the module 18 increases $G_{2\_provisional}$ by the factor $X_2$ so as to reach $G_{MAX}$, but still applies the factor $X_1$ (greater than $X_2$) to reduce $T_{exp2\_provisional}$. In this way, the predicted camera motion blur trail is reduced to reach the threshold, but accepting an exposure level below the level recommended by the auto-exposure module 14.

With reference back to step 109, in response to determining that the predicted camera motion blur trail is below the threshold, the module 18 determines an increase in $T_{exp2\_provisional}$ so that the predicted camera motion blur trail reaches the threshold, and a corresponding reduction to $G_{2\_provisional}$ (step 116). In this way, the predicted camera motion blur trail is maintained at the acceptable threshold level while reducing the noise level in the subsequent image frame. The provisional $T_{exp2\_provisional}$ and $G_{2\_provisional}$ are adjusted accordingly at step 114 before acquiring the subsequent image frame.

In alternative embodiments, when no relevant camera motion blur risk is detected, $T_{exp2\_provisional}$ and $G_{2\_provisional}$ are maintained without adjustment to acquire the subsequent image frame.

The operation of the method 100 continues until the system 10 determines, at step 105, that no further image frames have to be acquired for the video stream, and the method ends (step 117).

In some embodiments, when the IMU 15 has measured data over the exposure time of a sufficient number of successive previous image frames to make a periodicity in the change of the camera module orientation detectable, the method 100 further comprises detecting and using this periodicity to refine the prediction of the camera motion blur trail calculated at step 109 before acquisition of a subsequent image frame.

This refinement is particularly effective in situations where the camera module undergoes a change in orientation due to strong periodic motions of a portable device including the system 10. Examples of these situations include a user holding the device while walking or running with regular steps, or the device be mounted on an object that undergoes periodic motion (e.g., a mast swaying in the wind).

The image frames for a video stream acquired as per the operation of the method 100 are stored in the memory 20 of the system 10 (or any other memory accessible by the system 10). The stored image frames are retrieved by the video stabilization module 19 of the system 10 that performs image processing for generating a stabilized video stream in which camera motion blur trails are suppressed or at least limited due to the exposure parameters adjustment performed by the operation of the method 100. Alternatively, video stabilization on the acquired image frames can be performed by a video stabilization module that is external but operatively connected to the system 10 so as to retrieve the image frames from the memory 20.

In light of the above disclosed operation of the method 100, it will be appreciated that the threshold value used at step 109 can be fixed or can be changed according to user preferences to achieve a desired balance between image sharpness and the amount of visible sensor noise.

With reference back to the beginning of the method at step 101, it will be further appreciated that the exposure time and gain used for acquiring the first image frame for the video stream can also result from an adjustment of the provisional exposure time and gain recommended by the auto-exposure module 14. In particular, this adjustment can be based on operation of steps similar to the above disclosed method steps 102-114, but with the difference that the gyroscope data provided by the IMU 15 and used to predict a camera module rotation and corresponding camera motion blur trail during the acquisition of the first image frame are measured during a time window preceding the acquisition that does not correspond to the exposure time of a preceding image frame.

Finally, although in the above disclosed operation of the method 100 the gyroscope data provided by the IMU 15 and used to predict a camera module rotation and corresponding camera motion blur trail during the acquisition of a subsequent image frame are measured during the exposure time used for acquiring a preceding image frame, it will be noted that the gyroscope data can be generated during any measurement time window preceding the acquisition of the subsequent image frame. For example, a measurement time window longer than and including the exposure time of the preceding image frame can be employed, e.g., a measurement time window including the exposure times of a plurality of previously acquired image frames. Furthermore, a time window corresponding to a portion of the exposure time of the preceding image frame, or any other suitable time window different than the exposure time of the preceding image frame, can be employed.

The invention claimed is:

1. An image acquisition system comprising:
   a camera module including at least a lens and an image sensor, the lens being associated with a lens projection model;
   a motion sensor configured to measure data related to a camera module motion;
   a controller configured to determine a set of provisional exposure parameters to acquire each of successive image frames for a video stream, the provisional exposure parameters including a provisional exposure time in combination with a provisional gain; and
   the image acquisition system being configured to perform:
   determining the camera module motion based on angular velocity data measured using a gyroscope;
   transforming the measured angular velocity data into corresponding camera module orientations; and
   calculating a camera module rotation over at least one portion of a time window; and wherein predicting the camera motion blur comprises:
   selecting at least one reference point at a first position in an image space;
   projecting the at least one reference point into a virtual 3D space based on the lens projection model;
   rotating the projected at least one reference point according to the calculated camera module rotation;
   projecting back the rotated at least one reference point to a second position in the image space based on the lens projection module; and calculating a camera motion blur corresponding to the calculated camera module rotation as a distance between the first and second positions.

2. The system of claim 1, wherein the camera module rotation is calculated between a start and end of the time window.

3. The system of claim 1, wherein a plurality of camera module rotations are calculated over a plurality of corresponding portions of the time window, and wherein predicting the camera motion blur comprises combining calculated camera motion blurs corresponding to each of the plurality of calculated camera module rotations.

4. The system of claim 1, wherein said at least one reference point includes a center point in the image space.

5. The system of claim 1, wherein the at least one reference point includes at least a first reference point and a second, different, reference point in the image space, and wherein predicting the camera motion blur comprises:
    selecting the maximum of a first camera motion blur and a second camera motion blur calculated starting from the selection of the first reference point and the second reference point, respectively, in the image space.

6. The system of claim 1, wherein the lens has a variable focal length and the associated model is a variable lens projection model.

7. The system of claim 1, wherein the time window corresponds to at least a portion of an exposure time used to acquire a preceding image frame.

8. The system of claim 1, wherein the image acquisition system is further configured to perform:
    determining whether the predicted camera motion blur exceeds a threshold;
    in response to determining that the predicted camera motion blur exceeds the threshold, determining a reduction of the provisional exposure time determined to acquire the image frame so that the predicted camera motion blur reaches the threshold, and determining whether a corresponding increase in the provisional gain determined to acquire the image frame is below a maximum gain value;
    in response to determining that said corresponding increase in the provisional gain is below the maximum gain value, adjusting the provisional exposure time and gain by applying said reduction and corresponding increase; and
    acquiring the image frame using the adjusted provisional exposure time and gain.

9. The system of claim 8, wherein the image acquisition system is further configured to perform:
    in response to determining that said corresponding increase in the provisional gain exceeds the maximum gain value, adjusting the provisional exposure time and gain by:
    increasing the provisional gain to reach the maximum gain value, and either applying a corresponding reduction to the provisional exposure time; or
    applying said reduction of the provisional exposure time so that the predicted camera motion blur reaches the threshold; and
        acquiring the image frame by using the adjusted exposure time and gain.

10. The system of claim 8, wherein the image acquisition system is further configured to perform:
    in response to determining that the predicted camera motion blur is below the threshold, adjusting the provisional exposure time and gain by:
        increasing the provisional exposure time so that the predicted camera motion blur reaches the threshold;
        applying a corresponding reduction to the provisional gain; and
        acquiring the image frame by using the adjusted exposure time and gain.

11. A computer program product comprising a non-transitory computer-readable medium on which instructions are stored which, when executed on an image acquisition system, are configured to cause the image acquisition system to perform:
    determining a camera module motion based on angular velocity data measured using a gyroscope;
    transforming the measured angular velocity data into corresponding camera module orientations, and
    calculating a camera module rotation over at least one portion of a time window; and wherein predicting a camera motion blur comprises:
        selecting at least one reference point at a first position in an image space;
        projecting the at least one reference point into a virtual 3D space based on a lens projection model;
        rotating the projected at least one reference point according to the calculated camera module rotation;
        projecting back the rotated at least one reference point to a second position in the image space based on the lens projection module; and
        calculating a camera motion blur corresponding to the calculated camera module rotation as a distance between the first and second positions.

12. The computer program product of claim 11, wherein the camera module rotation is calculated between a start and end of the time window.

13. The computer program product of claim 11, wherein a plurality of camera module rotations are calculated over a plurality of corresponding portions of the time window, and wherein predicting the camera motion blur comprises combining calculated camera motion blurs corresponding to each of the plurality of calculated camera module rotations.

14. The computer program product of claim 11, wherein said at least one reference point includes a center point in the image space.

15. The computer program product of claim 11, wherein the at least one reference point includes at least a first reference point and a second, different, reference point in the image space, and wherein predicting the camera motion blur comprises:
    selecting the maximum of a first camera motion blur and a second camera motion blur calculated starting from the selection of the first reference point and the second reference point, respectively, in the image space.

16. The computer program product of claim 11, wherein the lens has a variable focal length and the associated model is a variable lens projection model.

17. The computer program product of claim 11, wherein the time window corresponds to at least a portion of an exposure time used to acquire a preceding image frame.

18. The computer program product of claim 11, wherein the instructions further cause the image acquisition system to perform:
    determining whether the predicted camera motion blur exceeds a threshold;
    in response to determining that the predicted camera motion blur exceeds the threshold, determining a reduction of a provisional exposure time determined to acquire the image frame so that the predicted camera motion blur reaches the threshold, and determining whether a corresponding increase in a provisional gain determined to acquire the image frame is below a maximum gain value;

in response to determining that said corresponding increase in the provisional gain is below the maximum gain value, adjusting the provisional exposure time and gain by applying said reduction and corresponding increase; and acquiring the image frame using the adjusted provisional exposure time and gain.

19. The computer program product of claim 18, wherein the instructions further cause the image acquisition system to perform:

in response to determining that said corresponding increase in the provisional gain exceeds the maximum gain value, adjusting the provisional exposure time and gain by:

increasing the provisional gain to reach the maximum gain value, and either applying a corresponding reduction to the provisional exposure time, or applying said reduction of the provisional exposure time so that the predicted camera motion blur reaches the threshold; and acquiring the image frame by using the adjusted exposure time and gain.

20. The computer program product of claim 18, wherein the instructions further cause the image acquisition system to perform:

in response to determining that the predicted camera motion blur is below the threshold, adjusting the provisional exposure time and gain by:

increasing the provisional exposure time so that the predicted camera motion blur reaches the threshold;

applying a corresponding reduction to the provisional gain; and acquiring the image frame by using the adjusted exposure time and gain . . . .

* * * * *